(12) United States Patent
Abbott et al.

(10) Patent No.: US 9,193,590 B2
(45) Date of Patent: *Nov. 24, 2015

(54) PROCESS FOR INCREASING HYDROGEN CONTENT OF SYNTHESIS GAS

(71) Applicant: JOHNSON MATTHEY PUBLIC LIMITED COMPANY, London (GB)

(72) Inventors: Peter Edward James Abbott, Eaglescliffe (GB); Gary Bevan Combes, Eagelscliffe (GB); Richard James Beavis, Wokingham (GB)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/355,628

(22) PCT Filed: Oct. 10, 2012

(86) PCT No.: PCT/GB2012/052505
§ 371 (c)(1),
(2) Date: May 1, 2014

(87) PCT Pub. No.: WO2013/072659
PCT Pub. Date: May 23, 2013

(65) Prior Publication Data
US 2014/0284525 A1    Sep. 25, 2014

(30) Foreign Application Priority Data
Nov. 18, 2011 (GB) .................................. 1119957.7

(51) Int. Cl.
*C01B 3/16* (2006.01)
*B01J 23/75* (2006.01)
*B01J 23/88* (2006.01)

(52) U.S. Cl.
CPC ........... *C01B 3/16* (2013.01); *C01B 2203/0288* (2013.01); *C01B 2203/0294* (2013.01);
(Continued)

(58) Field of Classification Search
CPC .............. C01B 3/16; C01B 2203/0288; C01B 2203/0294; C01B 2203/0415; C01B 2203/0475; C01B 2203/0485; C01B 2203/0495; C01B 2203/0883; C01B 2203/1047
See application file for complete search history.

(56) References Cited

U.S. PATENT DOCUMENTS

2001/0024632 A1    9/2001   Ward
2009/0246120 A1   10/2009   Raman et al.
(Continued)

FOREIGN PATENT DOCUMENTS

CN    101955153 A    1/2011
GB    1 491 499 A    11/1977
(Continued)

OTHER PUBLICATIONS

British Search Report, dated Feb. 28, 2012, from corresponding British application.
(Continued)

*Primary Examiner* — Stanley Silverman
*Assistant Examiner* — Syed Iqbal
(74) *Attorney, Agent, or Firm* — Young & Thompson

(57) ABSTRACT

A process for increasing the hydrogen content of a synthesis gas containing one or more sulphur compounds, the synthesis gas including hydrogen, carbon oxides and steam, and having a ratio, R, defined as $R=(H_2-CO_2)/(CO+CO_2) \le 0.6$ and a steam to carbon monoxide ratio $\le 1.8$, includes the steps of (i) adjusting the synthesis gas temperature, (ii) passing the temperature-adjusted synthesis gas through an adiabatic pre-shift vessel containing a bed of sulphur-tolerant water-gas shift catalyst at a space velocity $\ge 12{,}500$ hour$^{-1}$ to form a pre-shifted gas stream, and (iii) subjecting at least a portion of the pre-shifted gas stream to one or more further stages of water-gas shift.

26 Claims, 2 Drawing Sheets

Figure 1:
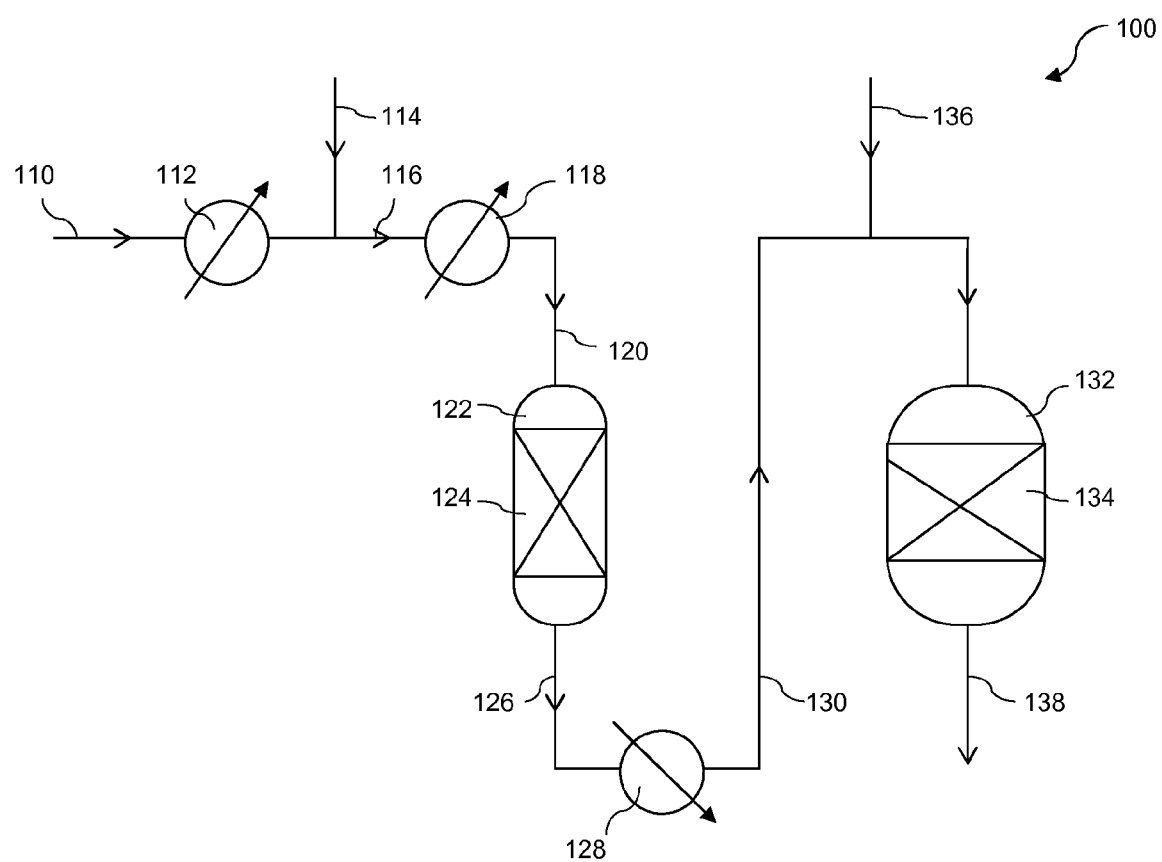

(52) U.S. Cl.
CPC . *C01B2203/0415* (2013.01); *C01B 2203/0475* (2013.01); *C01B 2203/0485* (2013.01); *C01B 2203/0495* (2013.01); *C01B 2203/0883* (2013.01); *C01B 2203/1047* (2013.01)

(56) References Cited

U.S. PATENT DOCUMENTS

| | | |
|---|---|---|
| 2010/0040527 A1 | 2/2010 | Randhava et al. |
| 2011/0137089 A1* | 6/2011 | Abbott .................. 568/840 |
| 2014/0032376 A1 | 1/2014 | Tyagi |

FOREIGN PATENT DOCUMENTS

| | | |
|---|---|---|
| GB | 1491499 A * | 11/1977 |
| GB | 2474164 A | 4/2011 |
| WO | 2009/019497 A2 | 2/2009 |
| WO | WO 2010013026 A1 * | 2/2010 |
| WO | 2010/121895 A1 | 10/2010 |
| WO | 2012-106148 | 8/2012 |

OTHER PUBLICATIONS

British Search Report, dated Feb. 25, 2013, from corresponding British application.

International Search Report, dated Jan. 24, 2013, from corresponding PCT application.

Walter Boll et al., "Gas Production, 3. Gas Treating," Ullman's Encyclopedia of Industrial Chemistry, Oct. 15, 2011, pp. 483-490.

* cited by examiner

PROCESS FOR INCREASING HYDROGEN CONTENT OF SYNTHESIS GAS

This invention relates to a process for increasing the hydrogen content of a synthesis gas, in particular increasing the hydrogen content of a synthesis gas generated from a carbonaceous feedstock.

Synthesis gas, also termed syngas, comprising hydrogen and carbon oxides (CO and $CO_2$) may be generated by a gasification of carbonaceous feedstocks such as coal, petroleum coke or other carbon-rich feedstocks using oxygen or air and steam at elevated temperature and pressure. Generally, the resulting synthesis gas is hydrogen deficient and to increase the concentration of hydrogen, it is necessary to subject the raw synthesis gas to the water-gas-shift reaction by passing it, in the presence of steam, over a suitable water-gas shift catalyst at elevated temperature and pressure. The $CO_2$ that is formed may then be removed in a downstream gas washing unit to give a hydrogen rich product gas. The synthesis gas generally contains one or more sulphur compounds and so must be processed using sulphur-tolerant catalysts, known as "sour shift" catalysts. The reaction may be depicted as follows;

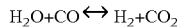

$$H_2O + CO \leftrightarrow H_2 + CO_2$$

This reaction is exothermic, and conventionally it has been allowed to run adiabatically, with control of the exit temperature governed by feed gas inlet temperature and composition. Furthermore, where it is required that only fractional shift conversion is needed to achieve a target gas composition, this is conventionally achieved by by-passing some of the synthesis gas around the reactor.

Side reactions can occur, particularly methanation, which is usually undesirable. To avoid this, the shift reaction requires considerable amounts of steam to be added to ensure the desired synthesis gas composition is obtained with minimum formation of additional methane. The cost of generating steam can be considerable and therefore there is a desire to reduce the steam addition where possible.

WO2010/106148 discloses a process to prepare a hydrogen rich gas mixture from a halogen containing gas mixture comprising hydrogen and at least 50 vol. % carbon monoxide, on a dry basis, by contacting the halogen containing gas mixture with water having a temperature of between 150 and 250 DEG C. to obtain a gas mixture poor in halogen and having a steam to carbon monoxide molar ratio of between 0.2:1 and 0.9:1 and subjecting said gas mixture poor in halogen to a water-gas shift reaction wherein part or all of the carbon monoxide is converted with the steam to hydrogen and carbon dioxide in the presence of a catalyst as present in one fixed bed reactor or in a series of more than one fixed bed reactors and wherein the temperature of the gas mixture as it enters the reactor or reactors is between 190 and 230 DEG C. The space velocity in the water-gas shift reactor is preferably between 6000-9000 $h^{-1}$. In the single Example, a space velocity of 8000 $hr^{-1}$ was used. Because this process operates at a low steam to CO ratio and at low inlet temperature it requires a relatively high catalyst volume. Therefore there is a need for a process operating at a low steam to CO ratio that requires less catalyst. Furthermore there is a need for a process that takes into account the variation in catalyst activity that occurs over its lifetime.

CN101955153A discloses a water-gas shift process in which 15-40% by volume of a raw material process gas is introduced into a pre-converting reactor, then the pre-converted process gas is mixed with the remaining raw material process gas and the mixed gas introduced into a main converting reactor to perform a converting reaction wherein the water/gas volume ratio is 0.8 to 3.0, the dry gas space velocity is 1,000 to 10,000 $m^3/h$, and the inlet temperature is 220 to 320° C. In the various examples, all of the involuntary steam in the by-pass flow is not used for shift reaction and extra steam has to be added to the stream passing to the preliminary-shift reactor.

We have found surprisingly that the disadvantages of the previous processes may be overcome using a pre-shift stage operated at a high gas hourly space velocity (GHSV).

Accordingly, the invention provides a process for increasing the hydrogen content of a synthesis gas containing one or more sulphur compounds, said synthesis gas comprising hydrogen, carbon oxides and steam, and having a ratio, R, defined as $R=(H_2-CO_2)/(CO+CO_2) \leq 0.6$ and a steam to carbon monoxide ratio $\leq 1.8$, comprising the steps of (i) adjusting the synthesis gas temperature, (ii) passing the temperature-adjusted synthesis gas through an adiabatic pre-shift vessel containing a bed of sulphur-tolerant water-gas shift catalyst at a space velocity $\geq 12,500$ $hour^{-1}$ to form a pre-shifted gas stream, and (iii) subjecting at least a portion of the pre-shifted gas stream to one or more further stages of water-gas shift.

In the present invention the synthesis gas comprising hydrogen and carbon oxides and containing one or more sulphur compounds may be produced by any method although it is particularly suited to synthesis gas produced by gasification of a carbonaceous feedstock at elevated temperature and pressure. Any known gasification technology may be used. The carbonaceous feedstock may be coal, petroleum coke or another carbon-rich feedstock. Preferably the carbonaceous feedstock is a coal. In coal gasification, a coal powder or aqueous slurry may be partially combusted in a gasifier in a non-catalytic process using oxygen or air and in the presence of steam at pressures up to about 85 bar abs and exit temperatures up to about 1450° C., preferably up to about 1400° C., to generate a raw synthesis gas comprising hydrogen and carbon oxides (carbon monoxide and carbon dioxide) and containing one or more sulphur compounds such as hydrogen sulphide and carbonyl sulphide.

The R ratio, defined as $R=(H_2-CO_2)/(CO+CO_2)$, in the synthesis gas feed is $\leq 0.6$ and preferably is in the range 0.1 to 0.6, more preferably 0.2 to 0.6. R may readily be calculated from the molar quantities of the components in the synthesis gas feed.

Before the synthesis gas is subjected to the water-gas shift reaction, it is preferably cooled, optionally filtered and then washed to remove particulates such as coal ash.

The synthesis gas comprises one or more sulphur compounds, such as hydrogen sulphide. In order that the water-gas shift catalysts remain suitably sulphided, the sulphur content of the synthesis gas fed to the water-gas shift catalyst is desirably >250 ppm.

If the synthesis gas does not contain enough steam for the water-gas shift process, steam may be added to the synthesis gas, for example by live steam addition or saturation or a combination of these. Steam may be added to the synthesis gas before or after temperature adjustment. The steam to carbon monoxide ratio (i.e. molar ratio) of the synthesis gas mixture fed to the water-gas shift catalyst in the pre-shift stage is $\leq 1.8$ and preferably is in the range 0.2 to 1.8, more preferably 0.7 to 1.8. In some embodiments, it may be desirable to operate with a ratio in the range 0.95 to 1.8.

The water-gas shift catalyst used in any of the water-gas shift stages may be any suitably stable and active water-gas shift catalyst. The synthesis gas contains one or more sulphur compounds and so the water-gas shift catalyst should remain effective in the presence of these compounds. In particular so-called "sour shift" catalysts may be used, in which the active components are metal sulphides. Preferably the water-gas shift catalyst comprises a supported cobalt-molybdenum catalyst that forms molybdenum sulphide in-situ by reaction with hydrogen sulphide present in the synthesis gas stream. The Co content is preferably 2-8% wt and the Mo content preferably 5-20% wt. Alkali metal promoters may also be present at 1-10% wt. Suitable supports comprise one or more of alumina, magnesia, magnesium aluminate spinel and titania. The catalysts may be supplied in oxidic form, in which case they require a sulphiding step, or they may be supplied in a pre-sulphided form. Particularly preferred sour shift catalysts are supported cobalt-molybdate catalysts such as KATALCO™ K8-11 available from Johnson Matthey PLC, which comprises about 3% wt. CoO and about 10% wt. $MoO_3$ supported on a particulate support containing magnesia and alumina.

It is desirable to adjust the temperature of, i.e. heat or cool, the synthesis gas so that the temperature within the water-gas shift vessel in the pre-shift stage is maintained within suitable operating conditions. For instance, after the synthesis gas is washed, thereby significantly cooling it, it may be advantageous to preheat the synthesis gas passing to the pre-shift stage vessel. A suitable heat exchanger can be placed on the feed synthesis gas stream. According to the particular details of the process, suitable media for heat exchange with the inlet gas may be, for example, another gas stream at a different temperature, steam or water. Furthermore, using such a heat exchanger, with a bypass provided around it, gives the ability to control the inlet temperature to the catalyst bed, independently of variation in other parameters.

The inlet temperature for the bed of water-gas shift catalyst in the pre-shift stage may be in the range 190 to 350° C., preferably 200 to 330° C.

Unlike the process disclosed in the aforesaid CN101955153A, in the present invention preferably all of synthesis gas is fed to the pre-shift stage. However, if desired, the synthesis gas may be divided into first and second streams prior to the pre-shift stage, with the first stream fed to the adiabatic pre-shift vessel containing the bed of water-gas shift catalyst, and the second stream, which may be termed the by-pass stream, by-passing one or more water-gas shift stages. Where a by-pass stream is employed, at least 60% by volume of the synthesis gas should be fed to the pre-shift stage, i.e. ≤40% by volume, preferably ≤30%, more preferably ≤20% of the synthesis gas may by-pass the pre-shift stage. The by-pass stream may be taken from the synthesis gas before or after temperature adjustment. The by-pass stream may by-pass one or more water-gas shift stages.

The by-pass stream may be fed to one or more of the pre-shifted gas stream, a shifted gas stream from the one or more subsequent water-gas shift stages, or separately to downstream processes. Utilising a vessel by-pass around the pre-shift stage and one or more subsequent water-gas shift stages, e.g. around the second shift stage, is preferred when it is desired to precisely control the overall extent of CO conversion.

If desired, the by-pass stream may be subjected to a carbonyl sulphide (COS) hydrolysis step by passing the stream over a COS hydrolysis catalyst, such as a particulate alumina or titania based catalyst, disposed in a suitable vessel. In this step, the COS in the by-pass stream is hydrolysed by steam to form $H_2S$, which may be easier to remove in downstream processes. In such a COS hydrolysis step, essentially no water-gas shift reaction takes place.

If desired, the pre-shift stage may be operated using two pre-shift vessels configured in parallel. This provides improved operational flexibility because one of the pre-shift vessels can be in operation while the other is shut down to allow change out of spent or deactivated catalyst that may, for example, have been poisoned by catalyst poisons present in the synthesis gas. Accordingly, a portion of the synthesis gas, after optional temperature adjustment and steam addition, may be fed in parallel to first and second water-gas shift units each comprising an adiabatic pre-shift vessel containing a bed of sulphur-tolerant water-gas shift catalyst operated at a space velocity $\geq 12,500$ $hour^{-1}$, to form first and second pre-shifted gas streams. The portion of synthesis gas that may be fed to the parallel second pre-shift vessel may be in the range 15 to 50% by volume of the synthesis gas fed to the pre-shift stage. The second pre-shifted gas stream may be combined with the first pre-shifted gas stream or may be passed through one or more subsequent water-gas shift stages to produce a second shifted gas stream. The second shifted gas stream may be combined with the first pre-shifted gas stream, a shifted gas stream obtained from the one or more water-gas shift stages performed on the first pre-shifted gas stream and/or a shift vessel by-pass stream.

In the pre-shift stage, the temperature-adjusted synthesis gas containing steam is passed at elevated temperature and pressure, preferably temperatures in the range 190 to 420° C. more preferably 200 to 400° C., and pressure up to about 85 bar abs, over the bed of water-gas shift catalyst in the adiabatic pre-shift vessel. The flow-rate of synthesis gas containing steam should be such that the gas hourly space velocity (GHSV) is $\geq 12,500$ $hour^{-1}$, and is preferably $\geq 15,500$ $hour^{-1}$, more preferably $\geq 17,500$ $hour^{-1}$, most preferably $\geq 20,000$ $hour^{-1}$.

In the pre-shift stage, the water-gas shift reaction occurs, consuming carbon monoxide and steam and forming carbon dioxide and hydrogen. Under the conditions, only a portion of the carbon monoxide and steam are consumed and so the pre-shifted gas stream comprises hydrogen, carbon monoxide, carbon dioxide and steam that may be further reacted in the one or more further stages of water-gas shift. Under the reaction conditions it is desirable to convert 10 to 40% (by moles) of the carbon monoxide present in the synthesis gas to carbon dioxide over the bed of water-gas shift catalyst.

The pre-shift stage reaction vessel operates adiabatically without applied cooling and so the reacting gases are heated as they pass through the one or more pre-shift reaction vessels. Thus some cooling of the pre-shifted gas may therefore be desirable before passing a pre-shifted gas stream to one or more further stages of water-gas shift.

At least a portion of the pre-shifted synthesis gas is fed to one or more additional water-gas shift stages. Preferably, the pre-shifted gas stream is fed to one, two or three further stage of water-gas shift in series or parallel to generate a shifted gas stream. If desired, additional steam may be added to the pre-shifted gas stream before the one or more further stages of water-gas shift. The one or more further stages of water-gas shift may be conventional adiabatic sour shift stages. The shift vessels used in such stages may be axial flow and/or radial flow. The subsequent water-gas shift stages may be operated under the same or different conditions to each other. The one or more further stages of water gas shift may be operated at temperatures in the range 190 to 440° C., preferably 190 to 420° C., and at gas-hourly space velocities $\geq 5000$ $h^{-1}$, preferably $\geq 6000$ $h^{-1}$, more preferably 6000-12000 $h^{-1}$, most preferably 6000-10000 $h^{-1}$.

If desired, a portion of the pre-shifted synthesis gas may by-pass one or more of the subsequent water-gas shift stages.

The present invention has a number of distinct advantages over the prior art processes. Heat generation is now divided between each of the first two shift stages. Therefore heat generation is less in each stage and it is easier to control the peak temperature in each bed, and thus minimise the formation of by-products. The process of the present invention does not rely on having a very low $H_2O/CO$ ratio in the feed gas to limit the theoretical equilibrium CO conversion and associated temperature rise. It is also applicable to a wide range of gasifier types, including those with a radiant cooling and quench section, which therefore have a higher, involuntary water content and are unsuitable for utilising the 'steam deficient' shift methodology set out in the aforesaid WO2010/106148.

In order to generate a hydrogen-rich synthesis gas the process preferably further comprises the steps of:
(i) cooling a shifted gas stream obtained from the one or more further stages of water-gas shift, or a mixture of the shifted gas stream and a bypass stream, to below the dew point to condense water,
(ii) separating the resulting condensate therefrom to form a dry gas stream,
(iii) feeding the dry gas stream to a gas-washing unit operating by means of counter-current solvent flow, to produce a product synthesis gas and
(iv) collecting the product synthesis gas from the washing unit.

The shifted gas stream may be subjected to these steps alone to form a dry shifted gas stream, or as a mixture with a by-pass stream. Alternatively, the bypass stream may be separately subjected to these steps to form a dry un-shifted by-pass stream, which is fed to the same or a separate gas washing unit. Where the dry un-shifted gas is fed to the same gas washing unit, preferably this un-shifted stream is fed to the gas washing unit such that the solvent flowing through said unit contacts first with the dry un-shifted synthesis gas and then the dry shifted gas stream.

The cooling step may be performed by heat exchange, e.g. with cold water, to cool the gases to below the dew point at which steam condenses. The resulting condensates, which comprise water and some contaminants, are separated.

The gases may be further cooled and dried, e.g. by means of chilled solvent, and then fed to a gas-washing unit operating by means of counter-current solvent flow. In the gas-washing unit, also known as an acid-gas removal (AGR) unit, a solvent suitable for the dissolution/absorption of carbon dioxide flows counter-current to gas flowing through the unit and dissolves/absorbs carbon dioxide present in the gas stream. A small quantity of other gas components in the gas stream, particularly carbon monoxide, will also be co-absorbed. Contaminants present in the gas stream that may poison downstream catalysts, e.g. sulphur compounds such as $H_2S$ & COS, may also be removed to differing extents. Using AGR, $CO_2$ levels may be reduced to below 5 mole %, on a dry gas basis.

Suitable solvents for absorbing $CO_2$ are physical solvents, including methanol, other alcohol or glycol products, such as glycols or polyethylene glycol ethers, and propylene carbonate, and chemical solvents, such as activated alkanolamines. Methanol is the preferred solvent where a downstream catalyst is being used. Methanol may be used at temperatures in the range −30 to −70° C. and at elevated pressures up to about 75 bar abs.

A gas-washing unit may comprise, for example, a column having a solvent inlet near the top and a solvent outlet near the bottom, down which a solvent suitable for the dissolution/absorption of carbon dioxide flows over one or more perforate trays or packing. The gases passing up through the column contact the solvent and carbon dioxide is dissolved/absorbed.

The gases may leave the column near the top via a synthesis gas outlet. The synthesis gas is cold and may be used to cool the feed gases to the gas-washing unit using suitable heat exchange means such as a spiral wound heat exchanger. In one embodiment, the dry by-pass synthesis gas mixture and dry shifted gas stream are fed separately to the unit, with the separate feeds arranged such that that the solvent contacts first with the dry by-pass synthesis gas mixture and then the dry shifted gas stream. This is in contrast to previous processes, where a synthesis gas mixture is fed to a gas-washing unit so that the solvent contacts the gas mixture in one stage. We have found that by separately feeding the two different gas streams to the unit such that that the solvent contacts first with the dry gas mixture and then the dry shifted gas stream, the efficiency of the process is improved, which offers the potential for reduced CO co-absorption and an increased potential for methanol or liquid hydrocarbon production from a given quantity or synthesis gas.

The process is desirably operated such that the synthesis gas collected from the gas-washing unit has an R ratio suited to the downstream use, such as methanol or dimethyl ether (DME) production, Fischer-Tropsch (FT) hydrocarbon production or synthetic natural gas (SNG) production. For the production of methanol or hydrocarbons, the desired stoichiometry ratio, R, of the product synthesis gas is preferably in the range 1.4 to 2.5. For generating SNG the range is preferably in the range 2.8 to 3.3. Alternatively, the sour shift reactor, additional downstream sour shift stage or stages, and gas-washing stage may be operated such that the synthesis gas collected from the gas-washing unit is hydrogen rich, with minimal CO and $CO_2$ content, where this is desirable. Such hydrogen-rich gas streams may be used in ammonia synthesis, for hydrogenation purposes, for chemicals synthesis, or power generation by combustion in a gas turbine with or without additional hydrocarbon fuels.

Figure 2:
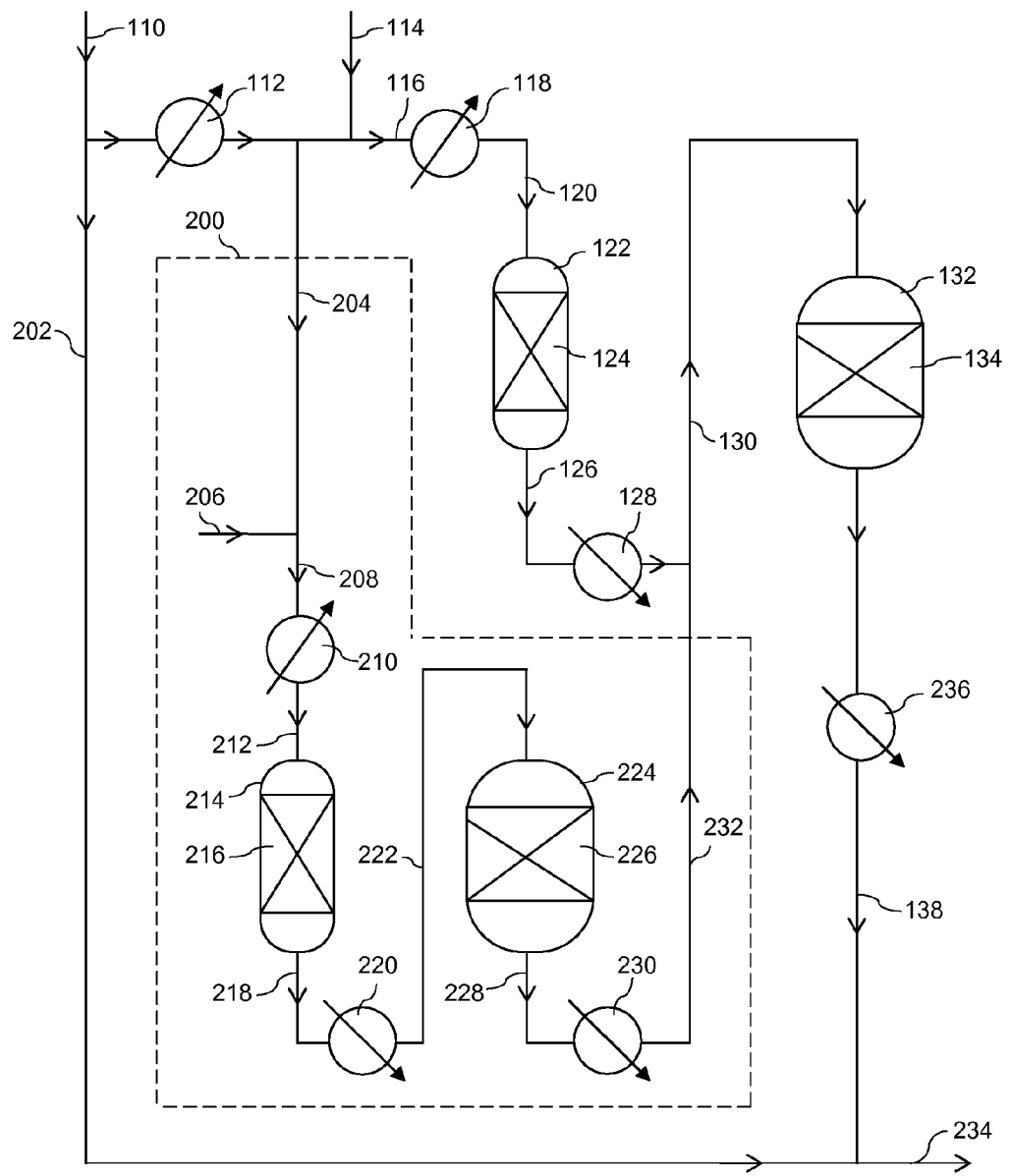

The invention is further illustrated by reference to the accompanying drawings in which;

FIG. 1 is a depiction of one embodiment according to the present invention comprising two water-gas shift vessels, and FIG. 2 is a depiction of a further embodiment comprising four water-gas shift vessels.

In FIG. 1, in water-gas shift unit 100, a synthesis gas 110 comprising hydrogen and carbon oxides and containing hydrogen sulphide is heated in heat exchanger 112 then mixed with steam 114 and the resulting synthesis gas fed via line 116 to a heat exchanger 118 where its temperature is adjusted to the desired inlet temperature. The temperature adjusted synthesis gas is fed from exchanger 118 via line 120 to a pre-shift vessel 122 containing a first fixed bed of particulate sulphided Co/Mo sulphur-tolerant water-gas shift catalyst 124. The flow of synthesis gas containing steam is controlled such that the space velocity in the first bed of catalyst is >12,500 $h^{-1}$. The synthesis gas containing steam reacts over the catalyst to form carbon dioxide and hydrogen. The resulting pre-shifted gas stream is recovered from the vessel 122 via line 126 and passed through heat exchanger 128 where it is cooled. The cooled pre-shifted gas stream is then fed via line 130 to a second water-gas shift vessel 132 containing a second fixed bed of particulate sulphided Co/Mo sulphur-tolerant water-gas shift catalyst 134. If desired, additional steam may be added to the pre-shifted gas mixture 130 upstream of vessel 132, via line 136. The pre-shifted gas mixture is further reacted over the water-gas shift catalyst 134 further increasing the hydrogen content of the synthesis gas. A hydrogen-enriched shifted gas stream is recovered from the second vessel 132 via line 138. The shifted gas stream may be subjected to further stages of water-gas shift, or sent for cooling, separation of the condensate and further processing into a hydrogen stream.

If the synthesis gas does not require steam addition, steam line 114 and heat exchanger 112 are not required.

Furthermore although not shown, if desired, a portion (e.g. up to 40% by volume) of the synthesis gas 110 may by-pass the pre-shift and second shift vessels (122, 132) and be combined with the shifted gas stream 138 recovered from the second vessel 132, or a portion of the pre-shifted gas 130 may by-pass the second shift vessel 132 and be combined with the shifted gas stream 138.

In FIG. 2 the water-gas shift unit 100 from FIG. 1 has an additional parallel water-gas shift unit 200 (surrounded by the dotted line) feeding a shifted gas stream to the second shift vessel 132, and a by-pass stream 202 feeding a portion of the synthesis gas to the shifted synthesis gas recovered from the second shift vessel 132.

Thus in FIG. 2 a portion of the heated synthesis gas recovered from exchanger 112 is fed to the unit 200 via line 204. In the unit 200, the portion of heated synthesis gas is mixed with steam from line 206 and fed via line 208 to a heat exchanger 210 where the synthesis gas temperature is adjusted. The temperature-adjusted synthesis gas is then is fed from exchanger 210 via line 212 to a second pre-shift vessel 214 containing a third fixed bed of particulate sulphided Co/Mo sulphur-tolerant water-gas shift catalyst 216. The flow of synthesis gas containing steam is controlled such that the space velocity in the third bed of catalyst is >12,500 h$^{-1}$. The synthesis gas containing steam reacts over the catalyst to form carbon dioxide and hydrogen. The resulting second pre-shifted gas stream is recovered from the vessel 214 via line 218 and passed through heat exchanger 220 where it is cooled. The cooled pre-shifted gas stream is then fed via line 222 to a fourth water-gas shift vessel 224 containing a fourth fixed bed of particulate sulphided Co/Mo sulphur-tolerant water-gas shift catalyst 226. If desired, additional steam may be added to the second pre-shifted gas mixture 222 upstream of vessel 224. The second pre-shifted gas mixture is further reacted over the water-gas shift catalyst 226 further increasing the hydrogen content of the synthesis gas. A hydrogen-enriched second shifted gas stream is recovered from the fourth vessel 224 via line 228. The hydrogen-enriched second shifted gas stream 228 is then passed through heat exchanger 230 where it is cooled before being fed via line 232 to the pre-shifted gas stream 130 and the combined stream fed to the second shift vessel 132.

A by-pass stream 202 is taken from the synthesis gas feed 110 and combined with the product stream 138 to form a combined product stream 234. Preferably a heat exchanger 236 is provided to cool the product synthesis gas 138 before it is combined with the by-pass stream 202. If desired a COS-hydrolysis unit (not shown) may be included in the by-pass line 202 to convert any COS present in the synthesis gas to hydrogen sulphide.

It will be understood that additional parallel pre-shift units may be included, all feeding shifted gas to the second shift vessel 132.

Furthermore it will be understood that the product shifted synthesis gas 138 or the combined product stream 234 may be fed to a gas washing unit to recover CO2 and H$_2$S and generate a hydrogen rich gas stream product. The carbon dioxide recovered from such processes may be used in carbon-capture and storage (CCS) processes or in enhanced oil recovery (EOR) processes.

The invention is further illustrated by reference to the following calculated Examples.

EXAMPLE 1 (COMPARATIVE)

A water-gas shift process similar to WO 2010/106148 A1 Example 1 was modelled. The temperature, pressure and gas compositions at the inlet and exit of the first bed of water-gas shift catalyst were as follows;

|  | Inlet | Outlet |
|---|---|---|
| Temperature (° C.) | 210 | 401 |
| Pressure (bar abs.) |  |  |
| Space velocity (h$^{-1}$) | 8000 |  |
| H2 (mole fraction) | 0.18528 |  |
| CO (mole fraction) | 0.56321 |  |
| CO2 (mole fraction) | 0.05575 |  |
| N2 (mole fraction) | 0.01230 |  |
| H2O (mole fraction) | 0.18019 |  |
| H2S (mole fraction) | 0.00164 |  |
| R ratio | 0.21 |  |
| Conversion (%) | 28.3 |  |
| H2O/CO ratio | 0.32 |  |
| Approach to Equilibrium (degrees C.) | 26 |  |

In this example the temperature can be kept low despite the high CO and low steam, because the low H2O/CO ratio (0.32) limits the maximum exotherm from the shift reaction. However the catalyst requirement is relatively high (SV=8000/hr), due to the low temperatures, low steam content and relatively close approach to WGS equilibrium constraining shift reaction rates.

In addition to the disadvantage of requiring a relatively high catalyst volume for a modest CO conversion, this approach is only applicable for very low steam:CO ratios as otherwise the shift exotherm will become large risking methanation and catalyst deactivation, therefore it is only relevant for a small subset of gasifier types, for example a dry feed gasifier with large heat recovery and low temperature scrubber. Furthermore, additional steam will need to be added before further shift reaction can be facilitated in downstream reactors.

EXAMPLE 2 (COMPARATIVE)

A water-gas shift process was modelled at a higher steam: CO ratio (1.1) and conventional inlet temperature but at a space velocity close to the aforesaid WO 2010/106148 A1. The temperature, pressure and gas compositions at the inlet and exit of the first bed of water-gas shift catalyst were as follows;

|  | Inlet | Outlet |
|---|---|---|
| Temperature (° C.) | 250 | 482 |
| Pressure (bar abs.) | 38.4 | 37.9 |
| Space velocity (h$^{-1}$) | 9000 |  |
| H2 (mole fraction) | 0.18219 | 0.39082 |
| CO (mole fraction) | 0.35899 | 0.15019 |
| CO2 (mole fraction) | 0.01325 | 0.22241 |
| N2 (mole fraction) | 0.03674 | 0.03674 |
| CH4 (mole fraction) | 0.00025 | 0.00031 |
| NH3 (mole fraction) | 0.00207 | 0.00207 |
| H2O (mole fraction) | 0.39488 | 0.18584 |
| H2S (mole fraction) | 0.00509 | 0.00546 |
| COS | 0.00044 | 0.00007 |
| Argon | 0.00609 | 0.00609 |
| R ratio | 0.45 |  |
| Conversion (%) | 58.2 |  |
| H2O/CO ratio | 1.10 |  |
| Approach to Equilibrium (degrees C.) | 80 |  |

This example represents a conventional adiabatic shift reactor, with a space velocity of 9000/hr. The large amount of catalyst gives a higher conversion of CO, but the exit temperature is very high, which gives a significant safety risk of the highly exothermic methanation reaction occurring to an unacceptable extent.

EXAMPLE 3

A water-gas shift process with the same dry gas composition as Example 2 was modelled at a steam:CO ratio of 1.1 and conventional inlet temperature but at employing a pre-shift stage at a much higher space velocity according to the present invention. The temperature, pressure and gas compositions at the inlet and exit of the first bed of water-gas shift catalyst were as follows;

|  | Inlet | Outlet |
|---|---|---|
| Temperature (° C.) | 278 | 400 |
| Pressure (bar abs.) | 38.4 | 37.9 |
| Space velocity (h$^{-1}$) | 21700 | |
| H2 (mole fraction) | 0.18219 | 0.28956 |
| CO (mole fraction) | 0.35899 | 0.25160 |
| CO2 (mole fraction) | 0.01325 | 0.12106 |
| N2 (mole fraction) | 0.03674 | 0.03674 |
| CH4 (mole fraction) | 0.00025 | 0.0026 |
| NH3 (mole fraction) | 0.00207 | 0.00207 |
| H2O (mole fraction) | 0.39488 | 0.28708 |
| H2S (mole fraction) | 0.00509 | 0.00551 |
| COS | 0.00044 | 0.00001 |
| Argon | 0.00609 | 0.00609 |
| R ratio | 0.45 | |
| Conversion (%) | 30.0 | |
| H2O/CO ratio | 1.10 | |
| Approach to Equilibrium (degrees C.) | 675 | |

This process overcomes the problem for the conventional adiabatic reactor (example 2). Because of the small catalyst volume and very high space velocity=21700/hr, the exit temperature can be prevented from being too high, by controlling the inlet temperature, whether the catalyst is fresh or partially deactivated through use, or if the reactor is operating at a reduced rate. Because of the higher steam level, the CO conversion is also slightly higher than for the 'steam deficient' example in WO2010106148. In this example of the invention the exit temperature is limited to 400° C., to avoid potential methanation reaction. After this pre-shift stage, the gas can be cooled and sent to downstream conventional shift reactor(s) and because the level of CO in the feed is now much reduced, there is a much reduced potential for methanation to occur in these reactors either.

The pre-shift process of the present invention is also applicable to a wide range of gasifier types, including those with a radiant cooling and quench section, which therefore have a higher, involuntary water content (and, as noted above, are unsuitable for utilising a 'steam deficient' shift methodology). It does not rely on having a very low H2O/CO ratio in the feed gas to limit the theoretical equilibrium CO conversion and associated temperature rise.

EXAMPLE 4 (COMPARATIVE)

A water-gas shift process with the same dry gas composition as Examples 2 and 3 was modelled with 36% of the gas being passed to the pre-converting reactor and 64% by-passing it as per the teaching of patent application CN101955153. Steam was added to the pre-shift feed gas in order to give approximately the same composition going into the main shift reactor (after mixing pre-shifted gas and bypass gas).

|  | Inlet | Outlet |
|---|---|---|
| Temperature (° C.) | 274 | 484 |
| Pressure (bar abs.) | 38.4 | 38.0 |
| Space velocity (h$^{-1}$) | 7600 | |
| H2 (mole fraction) | 0.12126 | 0.32513 |
| CO (mole fraction) | 0.23893 | 0.03496 |
| CO2 (mole fraction) | 0.00882 | 0.21305 |
| N2 (mole fraction) | 0.02445 | 0.02445 |
| CH4 (mole fraction) | 0.00017 | 0.00020 |
| NH3 (mole fraction) | 0.00138 | 0.00138 |
| H2O (mole fraction) | 0.59726 | 0.39310 |
| H2S (mole fraction) | 0.00339 | 0.00366 |
| COS | 0.00029 | 0.00002 |
| Argon | 0.00405 | 0.00405 |
| R ratio | 0.45 | |
| Conversion (%) | 85.4* | |
| H2O/CO ratio | 2.50 | |
| Approach to Equilibrium (degrees C.) | 8 | |

*This relates to the conversion in of the CO in the gas passing through the reactor; the overall conversion is 29.9%.

In comparison to example 3, this example requires a larger quantity of steam to be added and a larger catalyst volume in the pre-shift reactor.

The invention claimed is:

1. A process for increasing the hydrogen content of a synthesis gas containing one or more sulphur compounds, said synthesis gas comprising hydrogen, carbon oxides and steam, and having a ratio, R, defined as $R=(H_2-CO_2)/(CO+CO_2) \leq 0.6$ and a steam to carbon monoxide ratio $\leq 1.8$, comprising the steps of:
   (i) adjusting the synthesis gas temperature,
   (ii) passing the temperature-adjusted synthesis gas through an adiabatic pre-shift vessel containing a bed of sulphur-tolerant water-gas shift catalyst at a gas hourly space velocity $\geq 12,500$ hour$^{-1}$ in a pre-shift stage to form a pre-shifted gas stream, and
   (iii) subjecting at least a portion of the pre-shifted gas stream to one or more further stages of water-gas shift to form a shifted synthesis gas stream,
   wherein all of the synthesis gas is fed to the pre-shift stage, or the synthesis gas is divided into first and second streams, with the first stream passing over the bed of sulphur-tolerant water-gas shift catalyst in the pre-shift stage and the second stream by-passing the shift catalyst, thereby forming a by-pass stream, wherein $\leq 20\%$ by volume of the synthesis gas by-passes the pre-shift stage, and wherein the pre-shift stage converts 10 to 40% by moles of the carbon monoxide present in the temperature-adjusted synthesis gas to carbon dioxide.

2. The process according to claim 1 wherein the synthesis gas containing one or more sulphur compounds is formed by gasification of a carbonaceous feedstock at elevated temperature and pressure, followed by cooling and washing the resulting gas stream to remove particulate material.

3. The process according to claim 2 wherein the gasification is performed on a coal powder or aqueous slurry in a gasifier using oxygen or air and in the presence of steam at a pressure up to about 85 bar abs and an exit temperature up to 1450° C.

4. The process according to claim 2 wherein the steam to carbon monoxide ratio is in the range 0.2 to 1.8.

5. The process according to claim 2 wherein the R ratio is in the range 0.1 to 0.6.

6. The process according to claim 1 wherein the space velocity of the synthesis gas flowing through the bed of sulphur-tolerant water-gas shift catalyst in the pre-shift stage is ≥15,500 hour$^{-1}$.

7. The process according to claim 1 wherein the inlet temperature for the bed of water-gas shift catalyst in the pre-shift stage is in the range 190 to 350° C.

8. The process according to claim 1 wherein the synthesis gas is subjected to the water-gas shift reaction in the pre-shift vessel containing a supported cobalt-molybdenum water-gas shift catalyst.

9. The process according to claim 1 wherein the water-gas shift reaction over the bed of water-gas shift catalyst in the pre-shift stage is performed at a temperature in the range 190 to 420° C.

10. The process according to claim 1 wherein the by-pass stream is fed to one or more of the pre-shifted gas stream, a shifted gas stream from the one or more subsequent water-gas shift stages, or separately to downstream processes.

11. The process according to claim 1 wherein a portion of the synthesis gas is fed in parallel to first and second pre-shift vessels each containing a bed of sulphur-tolerant water-gas shift catalyst at a space velocity ≥12,500 hour$^{-1}$, to respectively form, as portions of the pre-shifted gas stream, a first pre-shifted gas stream and a second pre-shifted gas stream.

12. The process according to claim 11 wherein the second pre-shifted gas stream is combined with the first pre-shifted gas stream or passed through one or more subsequent water-gas shift stages to produce a second shifted synthesis gas stream.

13. The process according to claim 12 wherein the second shifted synthesis gas stream is combined with the first pre-shifted gas stream, or a shifted gas stream obtained from the one or more water-gas shift stages performed on the first pre-shifted gas stream, and/or the by-pass stream.

14. The process according to claim 1 wherein each of the one or more further stages of water-gas shift is performed in a vessel containing a supported cobalt-molybdenum water-gas shift catalyst.

15. The process according to claim 1 wherein each of the one or more further stages of water-gas shift are performed in an axial flow vessel or a radial flow vessel.

16. The process according to claim 1 wherein the one or more further stages of water-gas shift are performed at temperatures in the range 190 to 440° C.

17. The process according to claim 1 wherein the one or more further stages of water-gas shift are performed at gas-hourly space velocities ≥5000 h$^{-1}$.

18. The process according to claim 1 wherein the one or more further stages of water-gas shift are performed adiabatically.

19. The process according to claim 1 further comprising the steps of:
  (i) cooling a shifted gas stream obtained from the one or more further stages of water-gas shift, or a mixture of the shifted gas stream and a bypass stream, to below the dew point to condense water,
  (ii) separating the resulting condensate therefrom to form a dry shifted gas stream,
  (iii) feeding the dry shifted gas stream to a gas-washing unit operating by means of counter-current solvent flow, to produce a product synthesis gas enriched in hydrogen and
  (iv) collecting the product synthesis gas from the washing unit.

20. The process according to claim 2 wherein the R ratio is in the range 0.2 to 0.6.

21. The process according to claim 1 wherein the space velocity of the synthesis gas flowing through the bed of sulphur-tolerant water-gas shift catalyst in the pre-shift stage is ≥17,500 hour$^{-1}$.

22. The process according to claim 1 wherein the space velocity of the synthesis gas flowing through the bed of sulphur-tolerant water-gas shift catalyst in the pre-shift stage is ≥20,000 hour$^{-1}$.

23. The process according to claim 1 wherein the one or more further stages of water-gas shift are performed at temperatures in the range 190 to 420° C.

24. The process according to claim 1 wherein the one or more further stages of water-gas shift are performed at gas-hourly space velocities ≥6000 h$^{-1}$.

25. The process according to claim 1 wherein the one or more further stages of water-gas shift are performed at gas-hourly space velocities of 6000 to 12000 h$^{-1}$.

26. The process according to claim 1 wherein the one or more further stages of water-gas shift are performed at gas-hourly space velocities of 6000 to 10000 h$^{-1}$.

* * * * *